F. Fox,
Cage Trap.
N° 104,570.   Patented Jun. 21. 1870.
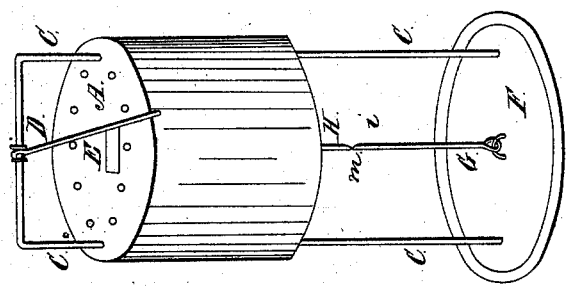
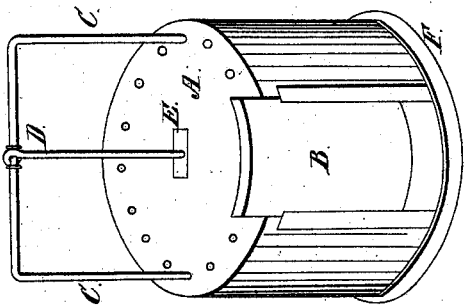
Witnesses:
A. B. Richmond
Roe Reisinger
Inventor:
Francis Fox

United States Patent Office.

FRANCIS FOX, OF MEADVILLE, PENNSYLVANIA.

Letters Patent No. 104,570, dated June 21, 1870.

IMPROVED ANIMAL-TRAP.

The Schedule referred to in these Letters Patent and making part of the same.

*To all whom it may concern:*

Be it known that I, FRANCIS FOX, of the city of Meadville, in the county of Crawford and State of Pennsylvania, have invented a new and improved Trap; and I do hereby declare that the following is a full and exact description of the same, reference being had to the accompanying drawing, and the letters of reference marked thereon.

Figure 1 is a perspective view of the trap, when the same is "sprung."

A is a cylinder of tin or other metal, with a door, B, in the side thereof.

F is a bottom-board.

C C, a bail of wire passing through holes in the cylinder A, and the ends thereof driven into the bottom-board F, as is better shown at fig. 2.

D is a rod or wire hung on the bail C C like the tongue of a buckle.

E is a stop on the top of the cylinder, and when the trap is "sprung" this rod drops down in the position shown in fig. 1, and thereby fastens the cylinder down securely, to prevent the escape of the animal caught in the trap.

The top of the cylinder A is perforated with holes, to let the air pass out as the cylinder falls.

Figure 2 represents my trap when it is "set."

In the center of the bottom F is a wire, G, hung, by a staple, to the bottom F.

H is a wire attached to the center of the top of the cylinder A.

Both G and H are filed nearly to a point at M.

To set the trap, the cylinder A is raised up to the position shown in fig. 2.

The bait is placed on the wire G, and rests on the flange i. The wire G is then placed under the wire H, which supports the cylinder A in the position shown.

It is very obvious that the least disturbance of the bait will cause the cylinder to fall.

What I claim as my invention, and desire to secure by Letters Patent, is as follows:

The combination of the cylinder A, bail C C, catch D, and wires G and H, when constructed and arranged to operate as herein described, for the purposes specified.

FRANCIS FOX.

Witnesses:
A. B. RICHMOND,
ROE REISINGER.